(12) United States Patent
Feichtinger et al.

(10) Patent No.: US 9,566,720 B2
(45) Date of Patent: Feb. 14, 2017

(54) APPARATUS FOR THE PRETREATMENT AND SUBSEQUENT CONVEYING, PLASTIFICATION, OR AGGLOMERATION OF PLASTICS

(71) Applicant: Erema Engineering Recycling Maschinen and Anlagen Gesellschaft M.B.H., Ansfelden (AT)

(72) Inventors: Klaus Feichtinger, Linz (AT); Manfred Hackl, Linz-Urfahr (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 6 days.

(21) Appl. No.: 14/351,873

(22) PCT Filed: Oct. 12, 2012

(86) PCT No.: PCT/AT2012/050151
§ 371 (c)(1),
(2) Date: Apr. 14, 2014

(87) PCT Pub. No.: WO2013/052979
PCT Pub. Date: Apr. 18, 2013

(65) Prior Publication Data
US 2014/0287081 A1    Sep. 25, 2014

(30) Foreign Application Priority Data
Oct. 14, 2011    (AT) ................. A 1508/2011

(51) Int. Cl.
*B29C 47/10*      (2006.01)
*B29B 17/04*      (2006.01)
(Continued)

(52) U.S. Cl.
CPC ........... *B29B 17/0412* (2013.01); *B01F 7/162* (2013.01); *B01F 15/0288* (2013.01);
(Continued)

(58) Field of Classification Search
CPC ... B01F 7/162; B01F 15/0288; B01F 15/0289; B01F 15/00538; B29B 2017/048; B29B 17/0412; B02C 18/086; B29C 47/1027; B29C 47/666
(Continued)

(56) References Cited

U.S. PATENT DOCUMENTS 2,927,007 A    3/1960    Kaether
3,867,194 A    2/1975    Straube
(Continued)

FOREIGN PATENT DOCUMENTS

AT         400315 B       12/1995
CN       101186103 A       5/2008
(Continued)

OTHER PUBLICATIONS

U.S. Appl. No. 92/166,521, filed Dec. 2015, Weigerstorfer et al.*
(Continued)

*Primary Examiner* — Charles Cooley
(74) *Attorney, Agent, or Firm* — Kilpatrick Townsend & Stockton LLP

(57) ABSTRACT

The invention relates to an apparatus for the pretreatment and subsequent conveying or plastification of plastics, with a container with a mixing and/or comminution implement that is rotatable around an axis of rotation, wherein, in a side wall, an aperture is formed, through which the plastics material can be removed, a multiscrew conveyor being provided, with at least two screws rotating in a housing, wherein the imaginary continuation of the longitudinal axis of the conveyor in a direction opposite to the direction of conveying passes the axis of rotation, where, on the outflow side, there is an offset distance between the longitudinal axis of the screw closest to the container, on the outflow side, and the radius that is parallel to the longitudinal axis, and in that the screws co-rotate.

17 Claims, 2 Drawing Sheets

(51) Int. Cl.
  *B01F 15/02* (2006.01)
  *B01F 7/16* (2006.01)
  *B29B 13/10* (2006.01)
  *B02C 18/08* (2006.01)
  *B29C 47/40* (2006.01)
  *B29C 47/00* (2006.01)
  *B29C 47/38* (2006.01)
  *B29C 47/58* (2006.01)
  *B29K 105/26* (2006.01)

(52) U.S. Cl.
  CPC ........ *B01F 15/0289* (2013.01); *B02C 18/086* (2013.01); *B29B 13/10* (2013.01); *B29C 47/0011* (2013.01); *B29C 47/1018* (2013.01); *B29C 47/1027* (2013.01); *B29C 47/38* (2013.01); *B29C 47/40* (2013.01); *B29B 2017/044* (2013.01); *B29B 2017/048* (2013.01); *B29C 47/585* (2013.01); *B29K 2105/26* (2013.01); *Y02W 30/625* (2015.05)

(58) Field of Classification Search
  USPC ....... 366/76.2, 76.3, 76.4, 76.6, 76.9, 76.91, 366/76.92, 76.93, 154.1, 155.1, 156.1, 366/158.4, 91, 147, 149, 168.1, 172.1, 366/172.2, 200, 314; 425/586–587
  See application file for complete search history.

(56) References Cited

U.S. PATENT DOCUMENTS

| | | | |
|---|---|---|---|
| 4,579,288 A | | 4/1986 | McDermid et al. |
| 5,102,326 A * | | 4/1992 | Bacher et al. ................ 425/202 |
| 5,282,548 A * | | 2/1994 | Ishihara ........................... 222/55 |
| 5,651,944 A * | | 7/1997 | Schulz et al. ................ 422/137 |
| 5,727,742 A * | | 3/1998 | Lawson ................ A47J 43/046 241/199.12 |
| 5,783,225 A * | | 7/1998 | Bacher et al. ................ 425/202 |
| 5,882,558 A * | | 3/1999 | Bacher et al. ............... 264/40.4 |
| 5,988,865 A * | | 11/1999 | Bacher et al. ............. 366/76.93 |
| 6,030,112 A * | | 2/2000 | Milek ................ B01F 7/00391 366/320 |
| 6,619,575 B1 * | | 9/2003 | Bacher et al. ............. 241/46.11 |
| 6,719,454 B1 * | | 4/2004 | Bacher et al. ................ 366/314 |
| 6,784,214 B1 * | | 8/2004 | Bacher et al. .................. 521/48 |
| 6,883,953 B1 * | | 4/2005 | Bacher et al. ............... 366/76.1 |
| 7,275,703 B2 * | | 10/2007 | Bacher et al. ............. 241/152.2 |
| 7,275,857 B2 * | | 10/2007 | Bacher et al. ................ 366/314 |
| 7,291,001 B2 * | | 11/2007 | Bacher et al. ................ 425/202 |
| 7,309,224 B2 * | | 12/2007 | Bacher et al. ................ 425/202 |
| 7,842,221 B2 * | | 11/2010 | Magni et al. .................. 264/322 |
| 8,399,599 B2 * | | 3/2013 | Hackl et al. ............... 528/308.3 |
| 8,419,997 B2 * | | 4/2013 | Hackl et al. .............. 264/328.17 |
| 8,616,478 B2 * | | 12/2013 | Weigerstorfer et al. ........ 241/57 |
| 8,992,067 B2 | | 3/2015 | Bacher et al. |
| 9,216,521 B2 * | | 12/2015 | Weigerstorfer ..... B29B 17/0412 |
| 9,254,603 B2 * | | 2/2016 | Feichtinger ......... B01F 15/0289 |
| 9,266,255 B2 * | | 2/2016 | Feichtinger ......... B01F 15/0289 |
| 9,266,272 B2 * | | 2/2016 | Feichtinger ......... B01F 15/0289 |
| 9,289,774 B2 * | | 3/2016 | Feichtinger ......... B01F 15/0289 |
| 9,289,919 B2 * | | 3/2016 | Feichtinger ......... B01F 15/0289 |
| 9,296,128 B2 * | | 3/2016 | Feichtinger ......... B01F 15/0289 |
| 9,358,547 B2 * | | 6/2016 | Hackl ..................... B02C 19/00 |
| 2004/0202744 A1 * | | 10/2004 | Bacher et al. ................ 425/207 |
| 2004/0232578 A1 | | 11/2004 | Magni et al. |
| 2006/0093696 A1 * | | 5/2006 | Bacher et al. ................ 425/200 |
| 2006/0292259 A1 * | | 12/2006 | Bacher et al. ................ 425/217 |
| 2007/0007375 A1 * | | 1/2007 | Bacher et al. ........... 241/199.12 |
| 2007/0102550 A1 * | | 5/2007 | Lin ................................ 241/277 |
| 2010/0101454 A1 * | | 4/2010 | Wendelin et al. ............ 106/243 |
| 2010/0140381 A1 * | | 6/2010 | Weigerstorfer et al. ........ 241/17 |
| 2011/0049763 A1 * | | 3/2011 | Hackl et al. .............. 264/328.17 |
| 2011/0251368 A1 * | | 10/2011 | Hackl et al. .................. 526/352 |
| 2012/0091609 A1 * | | 4/2012 | Feichtinger et al. ....... 264/37.31 |
| 2012/0200000 A1 | | 8/2012 | Klein et al. |
| 2013/0092768 A1 * | | 4/2013 | Feichtinger et al. ........... 241/20 |
| 2013/0113139 A1 * | | 5/2013 | Weigerstorfer et al. ...... 264/340 |
| 2013/0168201 A1 * | | 7/2013 | Hackl et al. .................. 193/2 R |
| 2014/0234461 A1 * | | 8/2014 | Feichtinger et al. ......... 425/202 |
| 2014/0234462 A1 * | | 8/2014 | Feichtinger et al. ......... 425/202 |
| 2014/0239104 A1 * | | 8/2014 | Feichtinger et al. ...... 241/188.1 |
| 2014/0248388 A1 * | | 9/2014 | Feichtinger et al. ......... 425/203 |
| 2014/0252147 A1 | | 9/2014 | Feichtinger et al. |
| 2014/0252148 A1 | | 9/2014 | Feichtinger et al. |
| 2014/0271968 A1 | | 9/2014 | Feichtinger et al. |
| 2014/0287081 A1 * | | 9/2014 | Feichtinger et al. ......... 425/202 |
| 2014/0291427 A1 | | 10/2014 | Feichtinger et al. |
| 2014/0295016 A1 | | 10/2014 | Feichtinger et al. |
| 2014/0299700 A1 | | 10/2014 | Feichtinger et al. |
| 2014/0312151 A1 | | 10/2014 | Feichtinger et al. |
| 2015/0239154 A1 * | | 8/2015 | Feichtinger ......... B29B 17/0026 |
| 2016/0096287 A1 * | | 4/2016 | Weigerstorfer ..... B29B 17/0412 |
| 2016/0101540 A1 * | | 4/2016 | Wendelin ........... A61B 5/04001 |

FOREIGN PATENT DOCUMENTS

| | | | | |
|---|---|---|---|---|
| DE | 2839446 B1 | 1/1980 | | |
| DE | 3525554 A1 | 2/1986 | | |
| DE | 10140215 A1 * | 2/2003 | ............... C08F 8/50 |
| DE | 202009015256 U1 | 4/2010 | | |
| EP | 0045734 A1 | 2/1982 | | |
| EP | 0103754 A1 | 3/1984 | | |
| EP | 0123771 A1 | 11/1984 | | |
| EP | 0321742 A1 | 6/1989 | | |
| EP | 0701505 A1 | 3/1996 | | |
| EP | 0735945 A1 | 10/1996 | | |
| EP | 0911131 A1 | 4/1999 | | |
| EP | 1181141 A1 | 2/2002 | | |
| EP | 1233855 A1 | 8/2002 | | |
| EP | 0820375 A1 | 1/2003 | | |
| EP | 1273412 A1 | 1/2003 | | |
| EP | 1401623 A1 | 3/2004 | | |
| EP | 1628812 A1 | 3/2006 | | |
| EP | 1628813 A1 | 3/2006 | | |
| EP | 2012997 A1 | 1/2009 | | |
| EP | 2196255 A1 | 6/2010 | | |
| ES | 2214171 T1 | 9/2004 | | |
| GB | 960641 | * 5/1961 | | |
| GB | 2030472 A1 | 4/1980 | | |
| JP | A-7-148736 | 6/1995 | | |
| JP | 2001-26019 A | 1/2001 | | |
| JP | 2001-30244 A | 2/2001 | | |
| SU | 536062 A1 | 11/1976 | | |
| UA | 1427 U | 10/2002 | | |
| WO | WO 97/18071 A1 | 5/1997 | | |
| WO | WO 01/81058 A1 | 11/2001 | | |
| WO | WO 0181058 A1 * | 11/2001 | | |
| WO | WO 02/36318 A1 | 5/2002 | | |
| WO | WO 03/004236 A1 | 1/2003 | | |
| WO | WO 03/103915 A1 | 12/2003 | | |
| WO | WO 03103915 A1 * | 12/2003 | ............... B29B 7/82 |
| WO | WO 2004/087391 A1 | 10/2004 | | |
| WO | WO 2004087391 A1 * | 10/2004 | ............ B29B 17/00 |
| WO | WO 2004/108379 A1 | 12/2004 | | |
| WO | WO 2010/118447 A1 | 10/2010 | | |
| WO | WO 2011/051154 A1 | 5/2011 | | |

OTHER PUBLICATIONS

"Recyclinganlage Mit Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.

Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.

(56) References Cited

OTHER PUBLICATIONS

Bacher H., "Recycling Von Thermplastischen Primaerabfaellen: Recycling Primary Thermoplastic Waste, "Plasteverbarbeiter, Huethig GmbH, Heidelberg, DE, vol. 46, No. 2, Feb. 1, 1995, pp. 94, 97, & 98, XP000494391, ISSN: 0032-1338.
ASN 14351677. Claims filed 03242015.
ASN 14351869. Claims filed 03112015.
International Search Report mailed Feb. 7, 2013, from PCT Application No. PCT/AT2012/050151 (6 pages).
International Preliminary Report on Patentability mailed Jan. 30, 2014, from PCT Application No. PCT/AT2012/050151 (11 pages).

\* cited by examiner

APPARATUS FOR THE PRETREATMENT AND SUBSEQUENT CONVEYING, PLASTIFICATION, OR AGGLOMERATION OF PLASTICS

The application is a U.S. National Phase of International Application No. PCT/AT2012/050151, filed Oct. 12, 2012, which claims priority to Austrian Patent Application No. A 1508/2011, filed Oct. 14, 2011, the disclosures of which are incorporated by reference herein.

BACKGROUND

The invention related to an apparatus for the pretreatment and subsequent conveying, plastification, or agglomeration of plastics.

The prior art reveals numerous similar apparatuses of varying design, comprising a receiver or cutter compactor for the comminution, heating, softening and treatment of a plastics material to be recycled, and also, attached thereto, a conveyor or extruder for the melting of the material thus prepared. The aim here is to obtain a final product of the highest possible quality, mostly in the form of pellets.

By way of example, EP 123 771 or EP 303 929 describe apparatuses with a receiver (receiver container) and, attached thereto, an extruder, where the plastics material introduced into the receiver is comminuted through rotation of the comminution and mixing implements and is fluidized, and is simultaneously heated by the energy introduced. A mixture with sufficiently good thermal homogeneity is thus formed. This mixture is discharged after an appropriate residence time from the receiver into the screw-based extruder, and is conveyed and, during this process, plastified or melted. The arrangement here has the screw-based extruder approximately at the level of the comminution implements. The softened plastics particles are thus actively forced or stuffed into the extruder by the mixing implements.

It is also known in principle that twin-screw extruders can be used and that these can be linked to appropriate cutter compactors.

Many of these designs, which have been known for a long time, however, are unsatisfactory in respect of the quality of the treated plastics material obtained at the outgoing end of the screw, and/or in respect of the throughput of the screw. Especially when twin screws are used, there are particular considerations which cannot be derived from the results for single screws.

A distinction can be made between co-rotating and counter-rotating, and also touching and tightly intermeshing, twin-screw conveyors or twin-screw extruders, as a function of the axial distance therein between the screws and of their relative direction of rotation.

In the case of co-rotating screws, the two screws rotate in the same direction with identical angular velocities.

Each of these types has particular application sectors and uses. In the case of the co-rotating twin-screw extruder, the conveying and the pressure increase are brought about in essence by virtue of the friction between the stationary housing wall and the material rotating concomitantly with the screw, and the conveying effect is mainly a result of drag flow. In the case of the counter-rotating twin-screw extruder, in contrast, the dominant principle is forced conveying.

Critical to the end quality of the product are, firstly, the quality of the pretreated or softened polymer material that enters the conveyor or extruder from the cutter compactor, and, additionally, the situation at intake and on conveying or, where appropriate, extrusion. Relevant factors here include the length of the individual regions or zones of the screw, and also the screw parameters, such as, for example, screw thickness, flight depths, and so on.

In the case of the present cutter compactor/conveyor combinations, accordingly, there are particular circumstances, since the material which enters the conveyor is not introduced directly, without treatment and cold, but instead has already been pretreated in the cutter compactor, viz. heated, softened and/or partly crystallized, etc. This is a co-determining factor for the intake and for the quality of the material.

The two systems—that is, the cutter compactor and the conveyor—exert an influence on one another, and the outcomes of the intake and of the further conveying, and compaction, where appropriate, are heavily dependent on the pretreatment and the consistency of the material.

One important region, accordingly, is the interface between the cutter compactor and the conveyor, in other words the region where the homogenized pretreated material is passed from the cutter compactor into the conveyor or extruder. On the one hand, this is a purely mechanical problem area, requiring the coupling to one another of two differently operating devices. Moreover, this interface is tricky for the polymer material as well, since at this point the material is usually, close to the melting range, in a highly softened state, but is not allowed to melt. If the temperature is too low, then there are falls in the throughput and the quality; if the temperature is too high, and if unwanted melting occurs at certain places, then the intake becomes blocked.

Furthermore, precise metering and feeding of the conveyor is difficult, since the system is a closed system and there is no direct access to the intake; instead, the feeding of the material takes place from the cutter compactor, and therefore cannot be influenced directly, via a gravimetric metering device, for example.

It is therefore critical to design this transition not only in a mechanically considered way, in other words with an understanding of the polymer properties, but at the same time to consider the economics of the overall operation—in other words, high throughput and appropriate quality. The preconditions to be observed here are in some cases mutually contradictory.

Co-rotating multi- or twin-screw conveyors must generally be operated with underfeed. With underfeed, the feed determines the throughput of the extruder, and material intake has to be very constant.

However, specifically in systems where there is a conveyor or extruder attached to a cutter compactor, the intake or feed into the twin-screw conveyor is anything but easy to adjust, and there is no possibility, for example, of metering by way of a gravimetric metering system. On the contrary, in a cutter compactor the rotating mixing and comminution implements bring about continuous feed of the pretreated, softened particles or a continuous flow of material to the intake aperture of the conveyor or extruder.

In addition, another factor common to the known apparatuses is that the direction of conveying or of rotation of the mixing and comminution implements, and therefore the direction in which the particles of material circulate in the receiver, and the direction of conveying of the conveyor, in particular an extruder, are in essence identical or have the same sense. This arrangement, selected intentionally, was the result of the desire to maximize stuffing of the material into the screw, or to force-feed the screw. This concept of stuffing the particles into the conveying screw or extruder screw in the direction of conveying of the screw was also very obvious and was in line with the familiar thinking of the person skilled in the art, since it means that the particles do not have to reverse their direction of movement and there is therefore no need to exert any additional force for the change of direction. An objective here, and in further derivative developments, was always to maximize screw fill and to amplify this stuffing effect. By way of example, attempts have also been made to extend the intake region of the extruder in the manner of a cone or to curve the comminution implements in the shape of a sickle, so that these can act like a trowel in feeding the softened material into the screw. Displacement of the extruder, on the inflow side, from a radial position to a tangential position in relation to the container further amplified the stuffing effect, and increased the force with which the plastics material from the circulating implement was conveyed or forced into the extruder.

Apparatuses of this type are in principle capable of functioning, and they operate satisfactorily, although with recurring problems:

By way of example, an effect repeatedly observed with materials with low energy content, e.g. PET fibres or PET foils, or with materials which at a low temperature become sticky or soft, e.g. polylactic acid (PLA) is that when, intentionally, stuffing of the plastics material into the intake region of the extruder or conveyor, under pressure, is achieved by components moving in the same sense, this leads to premature melting of the material immediately after, or else in, the intake region of the extruder or of the screw. This firstly reduces the conveying effect of the screw, and secondly there can also be some reverse flow of the said melt into the region of the cutter compactor or receiver, with the result that flakes that have not yet melted adhere to the melt, and in turn the melt thus cools and to some extent solidifies, with resultant formation of a clump or conglomerate made of to some extent solidified melt and of solid plastics particles. This causes blockage of the intake and caking of the mixing and comminution implements. A further consequence is reduction of the throughput or quantitative output of the conveyor or extruder, since adequate filling of the screw is no longer achieved. Another possibility here is that movement of the mixing and comminution implements is prevented. In such cases, the system normally has to be shut down and thoroughly cleaned.

Problems also occur with polymer materials which have already been heated in the cutter compactor up to the vicinity of their melting range. If overfilling of the intake region occurs here, the material melts and intake is impaired.

Problems are also encountered with fibrous materials that are mostly orientated and linear, with a certain amount of longitudinal elongation and low thickness or stiffness, for example plastics foils cut into strips. A main reason for this is that the elongate material is retained at the outflow end of the intake aperture of the screw, where one end of the strip protrudes into the receiver and the other end protrudes into the intake region. Since the mixing implements and the screw are moving in the same sense or exert the same conveying-direction component and pressure component on the material, both ends of the strip are subjected to tension and pressure in the same direction, and release of the strip becomes impossible. This in turn leads to accumulation of the material in the said region, to a narrowing of the cross section of the intake aperture, and to poorer intake performance and, as a further consequence, to reduced throughput. The increased feed pressure in this region can moreover cause melting, and this in turn causes the problems mentioned in the introduction.

Especially for co-rotating twin-screw conveyors, this type of stuffing effect is counter-productive, and it is very difficult to avoid overfeed.

SUMMARY

It is therefore an object of the present invention to overcome the disadvantages mentioned and to improve an apparatus of the type described in the introduction in such a way as to allow the screws to achieve problem-free intake, even of materials that are sensitive or strip-shaped, and to permit processing or treatment of these materials to give material of high quality, with high throughput, while avoiding overfeed of the conveyor.

The characterizing features of certain embodiments achieve this object in an apparatus of the type mentioned in the introduction.

A first provision here is that the imaginary continuation of the central longitudinal axis of the conveyor, in particular extruder, if this has only a single screw, or the longitudinal axis of the screw closest to the intake aperture, if the conveyor has more than one screw, in the direction opposite to the direction of conveying of the conveyor, passes, and does not intersect, the axis of rotation, where, on the outflow side, there is an offset distance between the longitudinal axis of the conveyor, if this has a single screw, or the longitudinal axis of the screw closest to the intake aperture, and the radius that is associated with the container and that is parallel to the longitudinal axis and that proceeds outwards from the axis of rotation of the mixing and/or comminution implement in the direction of conveying of the conveyor.

The direction of conveying of the mixing implements and the direction of conveying of the conveyor are therefore no longer in the same sense, as is known from the prior art, but instead are at least to a small extent in the opposite sense, and the stuffing effect mentioned in the introduction is thus reduced. The intentional reversal of the direction of rotation of the mixing and comminution implements in comparison with apparatuses known hitherto reduces the feed pressure on the intake region, and the risk of overfilling decreases. In this way, excess material is not stuffed or trowelled with excess pressure into the intake region of the conveyor, but instead, in contrast, there is in fact in turn a tendency to remove excess material from that region, in such a way that although there is always sufficient material present in the intake region, the additional pressure exerted is small or almost zero. This method can provide adequate filling of the screw and constant intake of sufficient material by the screw, without any overfilling of the screw with, as a further consequence, local pressure peaks where the material could melt.

Melting of the material in the region of the intake is thus prevented, and operating efficiency is therefore increased, maintenance intervals are therefore lengthened, and downtime due to possible repairs and cleaning measures is reduced.

By virtue of the reduced feed pressure, displaceable elements which can be used in a known manner to regulate the degree of filling of the screw react markedly more sensitively, and the degree of filling of the screw can be adjusted with even greater precision. This makes it easier to find the ideal point at which to operate the system, in particular for relatively heavy materials, for example regrind made of high-density polyethylene (HDPE) or PET.

Surprisingly and advantageously it has moreover been found that operation in the opposite sense, according to the invention, improves intake of materials which have already been softened almost to the point of melting. In particular when the material is already in a doughy or softened condition, the screw cuts the material from the doughy ring adjacent to the container wall. In the case of a direction of rotation in the direction of conveying of the screw, this ring would instead be pushed onward, and removal of an outer layer by the screw would not be possible, with resultant impairment of intake. The reversal of the direction of rotation, according to the invention, avoids this.

Furthermore, the retention or accumulation phenomena formed in the case of the treatment of the materials which have been described above and are in strip form or fibrous can be resolved more easily, or do not occur at all, since, at the aperture edge situated in the direction of rotation of the mixing implements on the outflow side or downstream, the direction vector for the mixing implements and the direction vector for the conveyor point in almost opposite directions, or in directions that at least to a small extent have opposite sense, and an elongate strip cannot therefore become curved around, and retained by, the said edge, but instead becomes entrained again by the mixing vortex in the receiver.

The overall effect of the design according to the invention is that intake performance is improved and throughput is markedly increased. The stability and performance of the entire system made of cutter compactor and conveyor is thus increased.

In this connection, the applicant has found through experimentation, and recognized, that precisely this non-aggressive intake resulting from the altered direction of rotation of the implements has particularly good suitability for co-rotating twin-screw conveyors, since the lack of stuffing effect assists underfeed, and overfeed effects are therefore avoided. The intake is more controlled, and less pressurized, and throughput is higher or operation is more reliable.

With this system it is possible to operate a co-rotating twin screw with underfeed. Different modes of operation can be established for different levels of compaction. With heavy bulk densities, it is thus possible to maintain a relatively low degree of compaction in the cutter compactor, and to create both underfeed and an adequate fill level. With light starting materials, the mode of operation with relatively high compaction in the cutter compactor is selected, and the same effect can be achieved.

Other advantageous embodiments of the invention are described via the following features:

In particular, it is advantageous if there are precisely two screws provided or the conveyor is a co-rotating twin-screw conveyor. This can give the most reliable results.

According to one preferred development of the invention, the screws are cylindrical and parallel to one another or the conveyor is a parallel twin-screw conveyor, in particular in the form of twin-screw extruder.

According to an alternative development, the screws are conical or the conveyor is a conical twin-screw conveyor or conical twin-screw extruder. This type of conveyor has particularly good suitability for intake of low-weight flowable solids.

If one of the screws is longer than the other(s), preferably by a length greater than or equal to three times the diameter of the screw, there is the advantageous possibility of building up a melt pressure.

It is also possible that, at least in the region of the intake aperture, the screws intermesh tightly or touch, in order to comply with the requirements of the material to be treated.

According to another advantageous embodiment that saves space and provides effective intake, one of the cross sections of the screws is vertically above the other, and the screws in the immediate region of the intake aperture are in particular symmetrical with respect to the centre of the intake aperture and at an equal distance from the plane of the intake aperture.

In a possible alternative, one of the cross sections of the screws is obliquely above the other or horizontally alongside the other, and only the screw closest to the intake aperture is in the immediate region of the intake aperture.

In this connection, it is particularly advantageous for intake performance if the screws or the screw closest to the intake aperture, viewed from the starting point that is close to the intake or to the container, where appropriate at the end close to the motor, of the screws, or from the intake aperture, in the direction towards the end or the discharge aperture of the conveyor, rotate(s) clockwise.

This is particularly advantageous for regrind materials, since these are generally very flowable. In known apparatuses with conventional screw rotation direction, material is charged to the screw solely through the effect of gravity, and the implements have only little influence. This makes it difficult to introduce energy into the material, since it has often been necessary specifically to make a large reduction in the height of the outer implements or even often to omit them. This in turn impairs the melting performance in the screw, since the material has not been adequately heated in the cutter compactor. This is all the more critical in the case of regrind materials, since regrind materials are thicker than foils, and it is all the more important that the interior of the particles is also heated.

If the screw rotation direction is then reversed, material is no longer automatically charged to the screw, and the implements are necessary for conveying the material into the upper region of the screw. This method is also successful in introducing adequate energy into the material to facilitate any subsequent melting. A further consequence of this is increased throughput, and also better quality, since a higher average temperature of the particles can reduce shear in the screw, and this in turn contributes to improved MFI values.

The diameters of the screws are advantageously identical.

According to an advantageous development of the invention, the conveyor is arranged on the receiver in such a way that the scalar product of the direction vector (direction vector that is associated with the direction of rotation) that is tangential to the circle described by the radially outermost point of the mixing and/or comminution implement or to the plastics material transported past the aperture and that is normal to a radius of the receiver, and that points in the direction of rotation or of movement of the mixing and/or comminution implement and of the direction vector that is associated with the direction of conveying of the conveyor at each individual point or in the entire region of the aperture or at each individual point or in the entire region immediately radially in front of the aperture is zero or negative. The region immediately radially in front of the aperture is defined as that region which is in front of the aperture and at which the material is just about to pass through the aperture but has not yet passed the aperture. The advantages mentioned in the introduction are thus achieved, and there is effective avoidance of all types of agglomeration in the region of the intake aperture, brought about by stuffing effects. In particular here, there is also no dependency on the spatial arrangement of the mixing implements and of the screw in relation to one another, and by way of example the orientation of the axis of rotation does not have to be normal to the basal surface or to the longitudinal axis of the conveyor or of the screw. The direction vector that is associated with the direction of rotation and the direction vector that is associated with the direction of conveying lie within a, preferably horizontal, plane, or in a plane orientated so as to be normal to the axis of rotation.

In another advantageous formation, the angle included between the direction vector that is associated with the direction of rotation of the mixing and/or comminution implement and the direction vector that is associated with the direction of conveying of the conveyor is greater than or equal to 90° and smaller than or equal to 180°, where the angle is measured at the point of intersection of the two direction vectors at the edge of the aperture situated upstream of the direction of rotation or of movement, in particular at the point that is on the said edge or on the aperture and is situated furthest upstream. This therefore describes the range of angles within which the conveyor must be arranged on the receiver in order to achieve the advantageous effects. In the entire region of the aperture or at each individual point of the aperture, the forces acting on the material are therefore orientated at least to a small extent in an opposite sense, or in the extreme case the orientation is perpendicular and pressure-neutral. At no point of the aperture is the scalar product of the direction vectors of the mixing implements and of the screw positive, and no excessive stuffing effect occurs even in a subregion of the aperture.

Another advantageous formation of the invention provides that the angle included between the direction vector that is associated with the direction of rotation or of movement and the direction vector that is associated with the direction of conveying is from 170° to 180°, measured at the point of intersection of the two direction vectors in the middle of the aperture. This type of arrangement is relevant by way of example when the conveyor is arranged tangentially on the cutter compactor.

In order to ensure that no excessive stuffing effect occurs, the distance, or the offset, between the longitudinal axis and the radius can advantageously be greater than or equal to half of the internal diameter of the housing of the conveyor or of the screw.

It can moreover be advantageous for these purposes to set the distance or offset between the longitudinal axis and the radius to be greater than or equal to 7%, or still more advantageously greater than or equal to 20%, of the radius of the receiver. In the case of conveyors with a prolonged intake region or with grooved bushing or with extended hopper, it can be advantageous for this distance or offset to be greater than or equal to the radius of the receiver. This is particularly true for cases where the conveyor is attached tangentially to the receiver or runs tangentially to the cross section of the container.

In a particularly advantageous embodiment here, the longitudinal axis of the conveyor or of the screw or the longitudinal axis of the screw closest to the intake aperture runs tangentially with respect to the inner side of the side wall of the container, or the inner wall of the housing does so, or the envelope of the screw does so, where it is preferable that there is a drive connected to the end of the screw, and that the screw provides conveying, at its opposite end, to a discharge aperture which is in particular an extruder head and which is arranged at the end of the housing.

In the case of conveyors that are radially offset, but not arranged tangentially, it is advantageous to provide that the imaginary continuation of the longitudinal axis of the conveyor in a direction opposite to the direction of conveying, at least in sections, passes, in the form of a secant, through the space within the receiver.

It is advantageous to provide that there is immediate and direct connection between the aperture and the intake aperture, without substantial separation or a transfer section, e.g. a conveying screw. This permits effective and non-aggressive transfer of material.

The reversal of the direction of rotation of the mixing and comminution implements circulating in the container can certainly not result from arbitrary action or negligence, and it is not possible—either in the known apparatuses or in the apparatus according to the invention—simply to allow the mixing implements to rotate in the opposite direction, in particular because the arrangement of the mixing and comminution implements is in a certain way asymmetrical or direction-oriented, and their action is therefore only single-sided or unidirectional. If this type of equipment were to be rotated intentionally in the wrong direction, a good mixing vortex would not form, and there would be no adequate comminution or heating of the material. Each cutter compactor therefore has its unalterably prescribed direction of rotation of the mixing and comminution implements.

In this connection, it is particularly advantageous to provide that the manner of formation, set-up, curvature and/or arrangement of the frontal regions or frontal edges that are associated with the mixing and/or comminution implements, act on the plastics material and point in the direction of rotation or of movement, differs when comparison is made with the regions that, in the direction of rotation or of movement, are at the rear or behind.

In an advantageous embodiment here, on the mixing and/or comminution implement there are implements and/or blades which, in the direction of rotation or of movement, have a heating, comminuting and/or cutting effect on the plastics material. The implements and/or blades can either have been fastened directly on the shaft or preferably have been arranged on a rotatable implement carrier or, respectively, a carrier disc arranged in particular parallel to the basal surface, or have been formed therein or moulded onto the same, optionally as a single piece.

In principle, the effects mentioned are relevant not only to compressing extruders or agglomerators but also to conveying screws that have no, or less, compressing effect. Here again, local overfeed is avoided.

In another particularly advantageous formation, it is provided that the receiver is in essence cylindrical with a level basal surface and with, orientated vertically in relation thereto, a side wall which has the shape of the jacket of a cylinder. In another simple design, the axis of rotation coincides with the central axis of the receiver. In another advantageous formation, the axis of rotation or the central axis of the container have been orientated vertically and/or normally in relation to the basal surface. These particular geometries optimize intake performance, with an apparatus design that provides stability and simple construction.

In this connection it is also advantageous to provide that the mixing and/or comminution implement or, if a plurality of mutually superposed mixing and/or comminution implements have been provided, the lowest mixing and/or comminution implement closest to the base is arranged at a small distance from the basal surface, in particular in the region of the lowest quarter of the height of the receiver, and also that the aperture is similarly arranged. The distance here is defined and measured from the lowest edge of the aperture or of the intake aperture to the container base in the edge region of the container. There is mostly some rounding of the edge at the corner, and the distance is therefore measured from the lowest edge of the aperture along the imaginary continuations of the side wall downwards to the imaginary outward continuation of the container base. Distances with good suitability are from 10 to 400 mm.

It is moreover advantageous for the treatment process if the radially outermost edges of the mixing and/or comminution implements almost reach the side wall.

The container does not necessarily have to have a cylindrical shape with circular cross section, even though this shape is advantageous for practical reasons and reasons of manufacturing technology. When container shapes that deviate from the cylindrical shape with circular cross section, examples being containers having the shape of a truncated cone or cylindrical containers which, in plan view, are elliptical or oval, a calculation is required for conversion to a cylindrical container which has circular cross section and the same volume capacity, on the assumption that the height of this imaginary container is the same as its diameter. Container heights here which are substantially higher than the resultant mixing vortex (after taking into account the distance required for safety) are ignored, since this excess container height is not utilized and it therefore has no further effect on the processing of the material.

The expression conveyor means mainly systems with screws that have non-compressing or decompressing effect, i.e. screws which have purely conveying effect, but also systems with screws that have compressing effect, i.e. extruder screws with agglomerating or plastifying effect.

The expressions extruder and extruder screw in the present text mean extruders or screws used for complete or partial melting of the material, and also extruders used to agglomerate, but not melt, the softened material. Screws with agglomerating effect subject the material to severe compression and shear only for a short time, but do not plastify the material. The outgoing end of the agglomerating screw therefore delivers material which has not been completely melted but which instead is composed of particles incipiently melted only at their surface, which have been caked together as if by sintering. However, in both cases the screw exerts pressure on the material and compacts it.

BRIEF DESCRIPTION OF THE DRAWINGS

Further features and advantages of the invention are apparent from the description of the inventive examples below of the subject matter of the invention, which are not to be interpreted as restricting, and which the drawings depict diagrammatically and not to scale.

Figure 1:
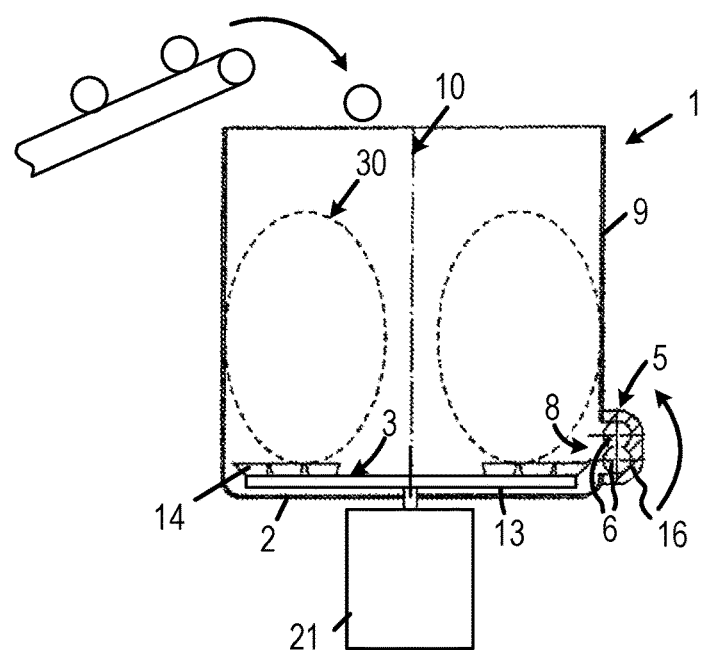
FIG. 1 shows a vertical section through an apparatus according to the invention with extruder attached approximately tangentially with one screw located above the other.

Neither the containers, nor the screws nor the mixing implements are to scale, either themselves or in relation to one another, in the drawings. By way of example, therefore, the containers are in reality mostly larger, or the screws longer, than depicted here.

DETAILED DESCRIPTION

The cutter compactor/extruder combinations depicted in different views in FIG. 1 and FIG. 2 have very similar structure and are therefore described together below. They differ mainly in the arrangement of the screws 6 with respect to one another, a point on which more details will be given below.

Figure 2:
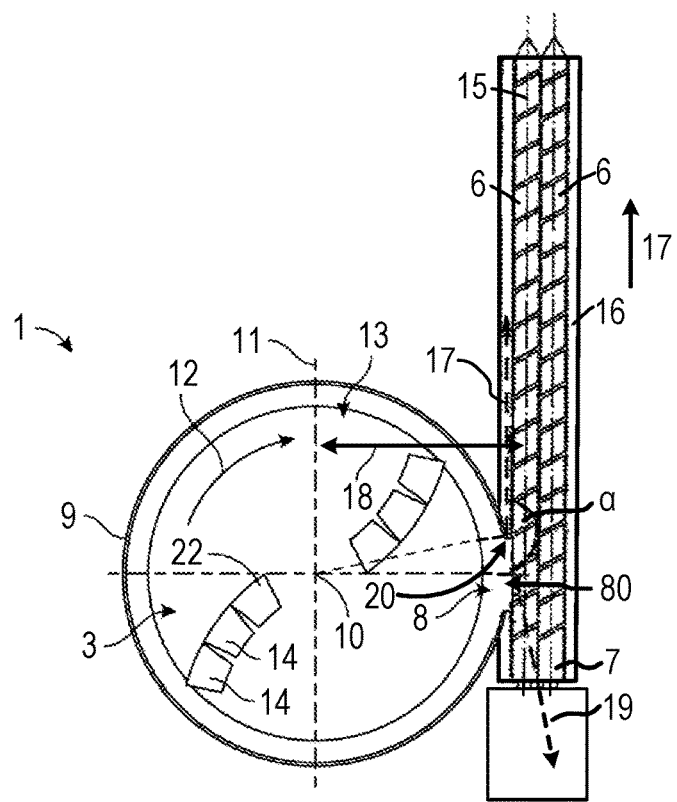
FIG. 2 shows a horizontal section through an alternative embodiment with extruder attached approximately tangentially with parallel cylindrical screws located alongside one another.

Each of the advantageous cutter compactor/extruder combinations depicted in FIG. 1 and FIG. 2 for the treatment or recycling of plastics material has a cylindrical container or cutter compactor or shredder 1 with circular cross section, with a level, horizontal basal surface 2 and with a vertical side wall 9 oriented normally thereto with the shape of a cylinder jacket.

Arranged at a small distance from the basal surface 2, at most at about 10 to 20%, or optionally less, of the height of the side wall 9—measured from the basal surface 2 to the uppermost edge of the side wall 9—is an implement carrier 13 or a level carrier disc orientated parallel to the basal surface 2, which carrier or disc can be rotated, in the direction 12 of rotation or of movement indicated by an arrow 12, around a central axis 10 of rotation, which is simultaneously the central axis of the container 1. A motor 21, located below the container 1, drives the carrier disc 13. On the upper side of the carrier disc 13, blades or implements, e.g. cutter blades, 14 have been arranged, and together with the carrier disc 13 form the mixing and/or comminution implement 3.

As indicated in the diagram, the blades 14 are not arranged symmetrically on the carrier disc 13, but instead have a particular manner of formation, set-up or arrangement on their leading convex frontal edges 22 facing in the direction 12 of rotation or of movement, so that they can have a specific mechanical effect on the plastics material. The radially outermost edges of the mixing and comminution implements 3 reach a point which is relatively close to, about 5% of the radius 11 of the container 1 from, the inner surface of the side wall 9.

The container 1 has, near the top, a charging aperture through which the product to be processed, e.g. portions of plastics foils, is charged by way of example by means of a conveying device in the direction of the arrow. The container 1 can, as an alternative, be a closed container and capable of evacuation at least as far as an industrial vacuum, the material being introduced by way of a system of valves. The said product is received by the circulating mixing and/or comminution implements 3 and is raised to form a mixing vortex 30, where the product rises along the vertical side wall 9 and, approximately in the region of the effective container height H, falls back again inward and downward into the region of the centre of the container, under gravity. The effective height H of the container 1 is approximately the same as its internal diameter D. In the container 1, a mixing vortex 30 is thus formed, in which the material is circulated in a vortex both from top to bottom and also in the direction 12 of rotation. By virtue of this particular arrangement of the mixing and comminution elements 3 or the blades 14, this type of apparatus can therefore be operated only with the prescribed direction 12 of rotation or movement, and the direction 12 of rotation cannot be reversed readily or without additional changes.

The circulating mixing and comminution implements 3 comminute and mix the plastics material introduced, and thereby heat and soften it by way of the mechanical frictional energy introduced, but do not melt it. After a certain residence time in the container 1, the homogenized, softened, doughy but not molten material is, as described in detail below, removed from the container 1 through an aperture 8, passed into the intake region of a twin-screw extruder 5, and received by screws 6 there and subsequently melted.

At the level of the, in the present case single, comminution and mixing implement 3, the said aperture 8 is formed in the side wall 9 of the container 1, and the pretreated plastics material can be removed from the interior of the container 1 through this aperture. The material is passed to a twin-screw extruder 5 arranged tangentially on the container 1, where the housing 16 of the extruder 5 has, situated in its jacket wall, an intake aperture 80 for the material to be received by the screws 6. This type of embodiment has the advantage that the screws 6 can be driven from the lower ends in the drawing by a drive, depicted only diagrammatically, in such a way that the upper ends of the screws 6 in the drawing can be kept free from the drive. The discharge aperture for the plastified or agglomerated plastics material conveyed by the screws 6 can therefore be arranged at the said upper end, e.g. in the form of an extruder head not depicted. The plastics material can therefore be conveyed without deflection by the screws 6 through the discharge aperture; this is not readily possible in the embodiments according to FIGS. 3 and 4.

There is connection for conveying of material or for transfer of material between the intake aperture 80 and the aperture 8, and in the present case this connection to the aperture 8 is direct and immediate and involves no prolonged intervening section and no separation. All that is provided is a very short transfer region.

In the housing 16, there are two cylindrical screws 6 with compressing effect, each mounted rotatably around its longitudinal axis 15. As an alternative, the screws can also be conical.

The extruder 5 conveys the material in the direction of the arrow 17. The extruder 5 is a conventional twin-screw extruder known per se in which the softened plastics material is compressed and thus melted, and the melt is then discharged at the opposite end, at the extruder head.

In the case of the embodiment according to FIG. 1, one of the two screws 6 is vertically above the other, and in the case of the embodiment according to FIG. 2 the two screws 6 are horizontally alongside one another.

The two screws 6 rotate in the same direction, and are therefore co-rotating.

The mixing and/or comminution implements 3 or the blades 14 are at approximately the same level as the central longitudinal axis 15 of the lowermost screw 6 in FIG. 1 or of the screw 6 adjacent to the intake aperture 80. The outermost ends of the blades 14 have adequate separation from the flights of the screws 6.

In the embodiments according to FIGS. 1 and 2, the extruder 5 is, as mentioned, attached tangentially to the container 1, or runs tangentially in relation to its cross section. In the drawings, the imaginary continuation of the central longitudinal axis 15 of the lower screw 6 or of the screw 6 adjacent to the intake aperture 80 in a direction opposite to the direction 17 of conveying of the extruder 5 towards the rear passes close to the axis 10 of rotation and does not intersect the same. On the outflow side, there is an offset distance 18 between the longitudinal axis 15 of this screw 6 and the radius 11 that is associated with the container 1 and that is parallel to the longitudinal axis 15 and that proceeds outwards from the axis 10 of rotation of the mixing and/or comminution implement 3 in the direction 17 of conveying of the extruder 5. In the present case, the imaginary continuation of the longitudinal axis 15 towards the rear does not pass through the space within the container 1, but instead passes it at a short distance.

The distance 18 is somewhat greater than the radius of the container 1. There is therefore a slight outward offset of the extruder 5, or the intake region is somewhat deeper.

The expressions "opposite", "counter-" and "in an opposite sense" here mean any orientation of the vectors with respect to one another which is not acute-angled, as explained in detail below.

In other words, the scalar product of a direction vector 19 which is associated with the direction 12 of rotation and the orientation of which is tangential to the circle described by the outermost point of the mixing and/or comminution implement 3 or tangential to the plastics material passing the aperture 8, and which points in the direction 12 of rotation or movement of the mixing and/or comminution implements 3, and of a direction vector 17 which is associated with the direction of conveying of the extruder 5 and which proceeds in the direction of conveying parallel to the central longitudinal axis 15 of the screw 6 is everywhere zero or negative, at each individual point of the aperture 8 or in the region radially immediately in front of the aperture 8, and is nowhere positive.

In the case of the intake aperture in FIGS. 1 and 2, the scalar product of the direction vector 19 for the direction 12 of rotation and of the direction vector 17 for the direction of conveying is negative at every point of the aperture 8.

The angle α between the direction vector 17 for the direction of conveying and the direction vector for the direction 19 of rotation, measured at the point 20 that is associated with the aperture 8 and situated furthest upstream of the direction 12 of rotation, or at the edge associated with the aperture 8 and situated furthest upstream, is approximately maximally about 170°.

As one continues to proceed downwards along the aperture 8 in FIG. 2, i.e. in the direction 12 of rotation, the oblique angle between the two direction vectors continues to increase. In the centre of the aperture 8, the angle between the direction vectors is about 180° and the scalar product is maximally negative, and further downwards from there the angle indeed becomes >180° and the scalar product in turn decreases, but still remains negative. However, these angles are no longer termed angles α, since they are not measured at point 20.

An angle β, not included in the drawing in FIG. 2, measured in the centre of the aperture 8, between the direction vector for the direction 19 of rotation and the direction vector for the direction 17 of conveying is about 178° to 180°.

The apparatus according to FIG. 2 represents the first limiting case or extreme value. This type of arrangement can provide a very non-aggressive stuffing effect or a particularly advantageous feed, and this type of apparatus is particularly advantageous for sensitive materials which are treated in the vicinity of the melting range, or for product in the form of long strips.

Figure 3:
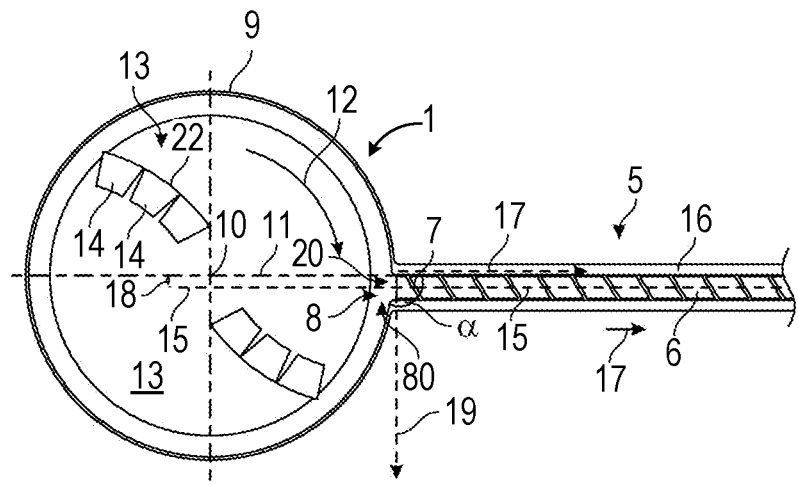
FIG. 3 shows another embodiment with minimal offset of the extruder.
Figure 4:
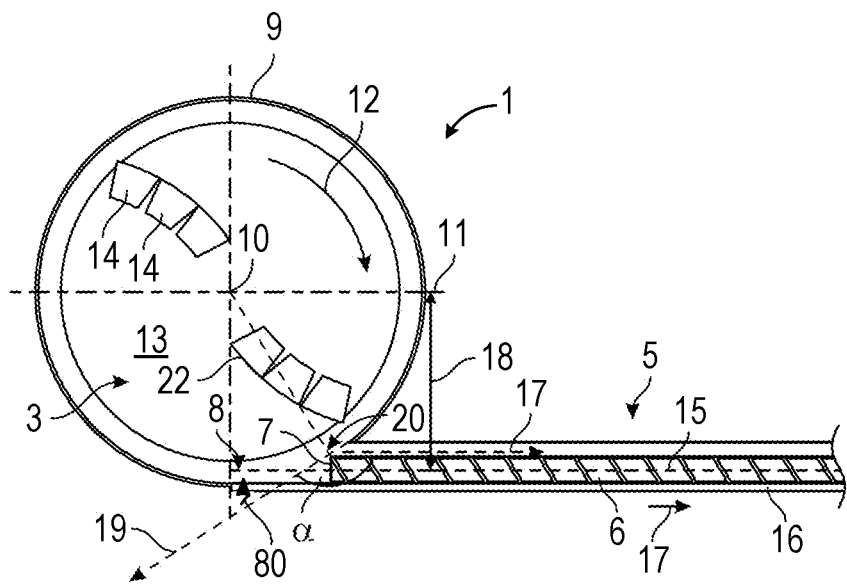
FIG. 4 shows another embodiment with relatively large offset of the extruder.

FIGS. 3 and 4 serve merely to illustrate the connection possibilities for the extruder with regard to the direction of rotation of the implements. The drawings do not include the values for L, B and A.

FIG. 3 shows an alternative embodiment in which an extruder 5 with two co-rotating screws 6, one located vertically above the other, is attached by its end 7, rather than tangentially, to the container 1. The screw 6 and the housing 16 of the extruder 5 have been adapted in the region of the aperture 8 to the shape of the inner wall of the container 1, and have been offset backwards so as to be flush. No part of the extruder 5 or of the screws 6 protrudes through the aperture 8 into the space within the container 1.

The distance 18 here corresponds to about 5 to 10% of the radius 11 of the container 1 and to about half of the internal diameter d of the housing 16. This embodiment therefore represents the second limiting case or extreme value with the smallest possible offset or distance 18, where the direction 12 of rotation or of movement of the mixing and/or comminution implements 3 is at least slightly opposite to the direction 17 of conveying of the extruder 5, and specifically across the entire area of the aperture 8.

The scalar product in FIG. 3 at that threshold point 20 situated furthest upstream is precisely zero, this being the point located at the edge that is associated with the aperture 8 and situated furthest upstream. The angle α between the direction vector 17 for the direction of conveying and the direction vector for the direction 19 of rotation, measured at point 20 in FIG. 3, is precisely 90°. If one proceeds further downwards along the aperture 8, i.e. in the direction 12 of rotation, the angle between the direction vectors becomes ever greater and becomes an oblique angle>90°, and at the same time the scalar product becomes negative. However, at no point, or in no region of the aperture 8, is the scalar product positive, or the angle smaller than 90°. No local overfeed can therefore occur even in a subregion of the aperture 8, and no detrimental excessive stuffing effect can occur in a region of the aperture 8.

This also represents a decisive difference in relation to a purely radial arrangement, since there would be an angle α<90° at point 20 or at the edge 20' in a fully radial arrangement of the extruder 5, and those regions of the aperture 8 situated, in the drawing, above the radius 11 or upstream thereof or on the inflow side thereof would have a positive scalar product. It would thus be possible for locally melted plastics product to accumulate in these regions.

FIG. 4 shows another alternative embodiment in which an extruder 5 with two co-rotating screws 6, one located vertically above the other, has been displaced somewhat further than in FIG. 3 on the outflow side, but is still not tangential as in FIGS. 1 and 2. In the present case, as also in FIG. 3, the rearward imaginary continuation of the longitudinal axis 15 of the screws 6 passes through the space within the container 1 in the manner of a secant. As a consequence of this, the aperture 8 is—measured in the circumferential direction of the container 1—wider than in the embodiment according to FIG. 3. The distance 18 is also correspondingly greater than in FIG. 3, but somewhat smaller than the radius 11. The angle α measured at point 20 is about 150°, and the stuffing effect is therefore reduced in comparison with the apparatus of FIG. 3; this is more advantageous for certain sensitive polymers. The inner wall of the housing 16 or the right-hand-side inner edge, as seen from the container 1, is tangential to the container 1, and therefore, unlike in FIG. 3, there is no oblique transitional edge. At this furthest downstream point of the aperture 8, on the extreme left-hand side in FIG. 4, the angle is about 180°.

The invention claimed is:

1. An apparatus for the pretreatment and subsequent conveying of thermoplastic waste, the apparatus comprising:
a container configured to hold the thermoplastic waste to be pretreated;
at least one mixing and/or comminution implement within the container, wherein the mixing and/or comminution implement is configured to pretreat the plastic material and comprises at least one blade configured to rotate around an axis of rotation, wherein the blade has a convex edge, and wherein pretreating the plastic material comprises at least one of mixing, heating, and comminuting the plastic material,
wherein the container comprises an aperture through which the pretreated thermoplastic waste exits the container, wherein the aperture is formed in a side wall of the container adjacent to the mixing and/or comminution implement,
at least one multiscrew conveyor configured to receive the pretreated thermoplastic waste through the aperture, the multiscrew conveyor comprising:
a housing comprising an intake configured to receive the pretreated thermoplastic waste from the container, and
first and second screws in the housing, wherein the first and second screws are configured to rotate in opposite directions and to convey the thermoplastic waste in a conveying direction away from the container,
wherein the imaginary continuation of the central longitudinal axis of the first screw is offset from the axis of rotation of the mixing and/or comminution implement at a point nearest the axis of rotation by an offset distance; and
a motor configured to rotate the mixing and/or comminution implement, wherein the motor is structured to rotate the mixing and/or comminution implement such that the convex edge of the blade of the mixing and/or comminution implement leads during rotation, wherein the motor is structured to rotate in a direction which causes the motion of the convex edge to be described by a direction vector such that when the convex edge is nearest the aperture, the motion vector describing the motion of the convex edge nearest the aperture is either perpendicular to the conveying direction or has a vector component which has a direction opposite the conveying direction.

2. The apparatus according to claim 1, wherein the screws comprise precisely two screws.

3. The apparatus according to claim 1, wherein the screws are substantially cylindrical and are parallel to one another.

4. The apparatus according to claim 1, wherein at least in the region of the intake, the screws intermesh tightly or touch.

5. The apparatus according to claim 1, wherein one of the screws is vertically above the other, and the screws in the immediate region of the intake are symmetrically positioned with respect to the center of the intake and are at an equal distance from the plane of the intake.

6. The apparatus according to claim 1, wherein the screw closest to the intake rotates clockwise.

7. The apparatus according to claim 1, wherein the conveyor is in contact with the container, a scalar product of the direction vector describing the motion of the portion of the convex edge nearest the aperture when the convex edge is adjacent the aperture, and another direction vector describing the conveying of the conveyor is zero or negative.

8. The apparatus according to claim 1, wherein an angle (α) between the direction vector describing the motion of the portion of the convex edge nearest the aperture when the convex edge is adjacent the aperture, and another direction vector describing the direction of the conveying of the conveyor is greater than or equal to 90° and less than or equal to 180°.

9. The apparatus according to claim 1, wherein an angle (β) between the direction vector describing the motion of the portion of the convex edge nearest the aperture when the convex edge is adjacent the aperture, and the conveying direction is from 170° to 180°.

10. The apparatus according to claim 1, wherein the offset distance is at least one of:
  greater than or equal to half of an internal diameter of the first screw, and
  greater than or equal to 7% of the radius of the container (1).

11. The apparatus according to claim 1, wherein the imaginary continuation of the longitudinal axis of the $1^{st}$ screw passes through the container.

12. The apparatus according to claim 1, wherein the conveyor is attached tangentially to the container, or wherein the longitudinal axis of the first screw runs tangentially with respect to the inner side of the side wall of the container, or the inner wall of the housing runs tangentially with respect to the inner side of the side wall of the container, or an envelope defined by rotation of the screws runs tangentially with respect to the inner side of the side wall of the container,
  wherein the apparatus further comprises:
    a drive connected to the first and second screws,
    a discharge aperture in the housing of the conveyor, and
    an extruder head connected to the discharge aperture.

13. The apparatus according to claim 1, wherein there is immediate and direct connection between the aperture and the intake aperture, without substantial separation, and without a transfer section or a conveying screw.

14. The apparatus according to claim 1, wherein the blade is on or at a rotatable implement carrier comprises a carrier disc and which is arranged parallel to a basal surface of the container.

15. The apparatus according to claim 1, wherein a curvature of the convex edge of the blade is different from a curvature of a trailing edge of the blade during rotation of the blade.

16. The apparatus according to claim 1, wherein the interior of container is substantially cylindrical comprising a basal surface, and comprising a side wall extending perpendicularly from the basal surface.

17. The apparatus according to claim 1, wherein the blade is arranged in the quarter of the container nearest the basal surface, at a distance of from 10 mm to 400 mm from the basal surface.

* * * * *

UNITED STATES PATENT AND TRADEMARK OFFICE
CERTIFICATE OF CORRECTION

| | |
|---|---|
| PATENT NO. | : 9,566,720 B2 |
| APPLICATION NO. | : 14/351873 |
| DATED | : February 14, 2017 |
| INVENTOR(S) | : Klaus Feichtinger et al. |

It is certified that error appears in the above-identified patent and that said Letters Patent is hereby corrected as shown below:

In the Claims

Column 14, Lines 15 and 16, Claim 1:
Replace "and second screws are configured to rotate in opposite directions and to convey the thermoplastic waste" with --and second screws are configured to co-rotate and to convey the thermoplastic waste--

Signed and Sealed this
First Day of August, 2017

Joseph Matal
*Performing the Functions and Duties of the*
*Under Secretary of Commerce for Intellectual Property and*
*Director of the United States Patent and Trademark Office*